Patented Mar. 28, 1944

2,345,311

UNITED STATES PATENT OFFICE 2,345,311

PREPARATION OF ALKALINE EARTH PIGMENTS AND COATING COMPOSITIONS

Alfred D. Wilson, Westbrook, Maine, assignor to S. D. Warren Company, Boston, Mass., a corporation of Massachusetts No Drawing. Application September 30, 1941, Serial No. 413,039

13 Claims. (Cl. 106—148)

This invention relates to improvements in alkaline earth metal pigment materials for use in paper-coating compositions, water paints, and the like.

In the manufacture of paper, such as that used for fine half-tone reproductions or the like, it is customary to apply a "mineral-coating" composition containing pigment and adhesive made into an aqueous slurry. The adhesive may be casein, glue, starch, or the like. The pigment generally consists of one or more of the following: clay, talc, satin white, blanc fixe, calcium carbonate, zinc sulfide, titanium dioxide, or the like.

In the great majority of cases the adhesive, especially when protein adhesive is used, constitutes the more expensive component of the coating mixture. Consequently it is essential, from the standpoint of practical manufacturing, that the proportion of adhesive to pigment be maintained at the lowest figure consistent with production of coated paper of the desired quality. The least quantity of the adhesive that will bind a fixed quantity of the pigment satisfactorily in use may be called the "adhesive requirement" of the pigment. Naturally, this requirement will vary depending upon the conditions under which the pigment is used.

The relative amount of adhesive required to bind the pigment of the mineral coating to paper so that the same can be printed satisfactorily may be determined by coating a series of sheets of paper of the same quality, using a standard weight of coating in each case but varying the proportion of adhesive to pigment; drying and calendering the coated sheets; and then printing them, with an arbitrarily chosen "standard" ink, under the same conditions to which they would be exposed in actual use. The adhesive requirement in this case, of course, is the least quantity of adhesive which will yield a coating which shows no weakness on the printing press. The printing test just described is probably the most accurate method of determining the adhesive requirement for paper to be used under the same conditions. By means of such a test, or others giving similar results, variations in adhesive requirement may be noted among different pigments, or among samples of the same pigment subjected to various treatments.

In pigments for use in coating compositions for making mineral-coated paper, or for use in casein paints or the like, a low adhesive requirement is most desirable. In fact, a pigment of relatively high price but of low adhesive requirement may actually be less costly to use than a much cheaper pigment of high adhesive requirement. Consequently, the value of an otherwise very desirable pigment may be seriously limited, for coating use, by a high adhesive requirement.

Pigments of fine particle size, excellent whiteness, good hiding power, and good finishing qualities may be easily and cheaply made by carbonation, under controlled conditions, of high calcium or magnesium limes by means of carbonic acid or other soluble carbonates, or by precipitation from solutions of calcium and/or magnesium salts. Such pigments, comprising calcium carbonate, magnesium carbonate, and mixtures of calcium carbonate with magnesium carbonate, magnesium basic carbonate, or magnesium hydroxide, tend to possess undesirably high adhesive requirements; this tendency is especially pronounced in pigments of the finer and more desirable particle sizes.

Satin white is another widely used alkaline earth pigment having fine particle size and high adhesive requirement. It is made by reacting slaked lime with alum or aluminum sulfate; its composition is not certainly known, but the present belief is that satin white comprises calcium sulfoaluminate.

A surprising reduction in the adhesive requirements of such high adhesive requirement pigments as those previously mentioned is achieved by the practice of the invention. Less spectacular but still of real value is the effect of the invention upon the quantity of adhesive required by other alkaline earth metal pigments which have relatively low adhesive requirements, such as blanc fixe or barium sulfate, barium carbonate, calcium sulfite, calcium sulfate, and the like. The practice of the invention lowers the adhesive requirements of all of the latter pigments by a substantial, although naturally not by such a large, amount per unit weight of pigment as in the case of pigments like satin white or fine calcium carbonate having high initial adhesive requirements.

The alkaline earth metal pigments consist of pigments which are compounds of the alkaline earth metals, magnesium, calcium, strontium, and barium. Of these, all that are at present used to any considerable extent in the paper-coating industry have been mentioned previously in this disclosure, and the invention is applicable to all of these without exception.

The term "pigment" is used herein to include mineral matter which in the oil-paint trade is considered as filler or extender, but which in an aqueous vehicle does exhibit real hiding power because of the low refractive index of that vehicle. To be classed as pigment material, the mineral matter must be in the form of powder of which substantially all particles are below 40 microns and above 0.1 micron in effective diameter. Obviously, coarse material is not satisfactory for use as pigment without first being subdivided. On the other hand, particles smaller than 0.1 micron in diameter are of colloidal dimensions and are deficient in hiding power and color; furthermore, other characteristics of such colloidal materials, such as viscosity of their aqueous suspensions or the like, sharply differentiate them from pigments. Accordingly colloidal materials are expressly excluded from the materials called "pigments" to which this invention relates.

In the practice of the invention, an alkaline earth metal pigment (e. g., satin white, calcium carbonate, blanc fixe, or the like) is deflocculated in an aqueous medium by the use of a small proportion of a suitable deflocculating agent. Subsequently, the deflocculated mixture is dewatered to such a degree that the pigment mixture becomes definitely non-fluid. Dewatering may be accomplished by filtration or by evaporation or by a combination of these operations as desired and according to the extent of dewatering required.

It is to be noted that the deflocculated aqueous pigment mixture should be dewatered at least to a state where it is definitely non-fluid, that is, to a relatively thick paste, which term (i. e., "relatively thick paste") is here used to describe the condition of the dewatered mixture from the point at which it barely becomes non-fluid to the point at which it becomes substantially dry. By "substantial dryness" is here meant a condition where the pigment appears no more than slightly damp, which condition usually occurs when the solids content is about 85 to 90%. The term "dryness" as used henceforth includes both substantial dryness and complete dryness. A suitable and preferred method for dewatering to substantial dryness is to dry the deflocculated slurry on the surface of an internally heated drum dryer.

In evaporating the deflocculated slurry to dryness care should be exercised not to overheat the material sufficiently to change its chemical identity. Satin white in particular must not be heated sufficiently to drive off water of constitution or crystallization.

Generally speaking, the adhesive requirement of the pigment decreases as the extent of dewatering in the presence of deflocculant increases, up to the point of substantial dryness. Of course, dewatering may, if desired, be continued to complete dryness, although usually such complete drying is not advantageous: ordinarily, going from substantial dryness to complete dryness has no more than a slight effect upon the adhesive requirement, and usually it is not worth the added trouble it entails in increasing the difficulty in re-dispersing the pigment for later use.

In the case of a pigment which normally forms a thick aqueous paste at a low solids content, e. g., satin white and many calcium or magnesium carbonates, dewatering a deflocculated aqueous mixture to only a moderate degree reduces the adhesive requirement substantially and to an extent which may be sufficient for many purposes. For example, some of these pigments of which a large portion of the particles are about one micron or less in diameter tend to form bulky sludges from which water is separated with difficulty. A specific instance is a good grade of finely subdivided calcium carbonate which when filtered on a commercial type of vacuum filter yields a filter cake of only about 35% solids which cake is sufficiently "dry" to break with a characteristic fracture. If, however, to such a sludge, before or after such partial concentration, a small quantity of deflocculating agent is added, the sludge becomes very fluid and may then easily be concentrated by filtration to a solids content of 60% or more. There results from such concentration a very substantial reduction in adhesive requirement, which may be sufficient for many purposes. In other cases it may be preferable to continue the dewatering until the pigment is substantially dry.

There are of course a great many substances which satisfactorily deflocculate the alkaline earth metal pigments. Colloidal deflocculating agents are generally satisfactory, including gums such as gum arabic, proteins such as casein or soy bean protein, and starches, such as oxidized starch. The particular deflocculating agent to be used in any specific case is a matter of choice which may be influenced by the particular pigment being treated and the particular use to which the treated pigment is to be put. In general, gum arabic is a satisfactory deflocculant for the pigments comprising calcium compounds. Casein is very satisfactory, and sometimes to be preferred, for deflocculating alkaline earth metal carbonates. It is often good practice to use as deflocculant the same material which in greater quantity is to be used with the pigment as adhesive in preparing a coating composition. In any case it is advisable to use a deflocculating agent which is compatible with the adhesive with which the pigment is to be used.

The minimum proportion of deflocculating agent to pigment which yields optimum results appears to be that which will result in a suspension of maximum fluidity at the particular solids content under consideration; that is, sufficient agent to deflocculate the pigment completely. Somewhat less deflocculant than the quantity required for optimum results may be used with some measure of success, or considerably more than the minimum quantity required may, if desired, be used without apparent disadvantage. The minimum quantity of deflocculant required seems to bear a rough relationship to the initial adhesive requirement of the pigment in question. That is, a pigment of fine particle size and high initial adhesive requirement generally (but not always) requires more deflocculant than a pigment having low initial adhesive requirement. In any case, however, the proportion of deflocculant to pigment actually required is very materially smaller than—less than one-half of—the proportion that would be required to bind that same pigment satisfactorily if the same deflocculant were to be used as the adhesive for the pigment in a coating composition for use in making coated printing paper. In the great majority of cases, from about 0.25% to about 5.0% of deflocculating agent (based on the dry weight of pigment present) includes the preferred working range; though in an occasional case of pigment having unusually high initial adhesive requirement it may be desirable to use somewhat more deflocculating agent. It is obvious that in cases where dewatering is accomplished by filtration with consequent loss of effluent, and in all cases in which the deflocculating agent does not also serve as adhesive, considerations of economy indicate that the quantity of deflocculant used be kept to the minimum actually required for complete deflocculation of the pigment. In other cases, where the deflocculant acts also as adhesive, and where dewatering is accomplished solely by evaporation, there is of course no loss of material when considerable deflocculant is used in excess of that actually required to achieve fluidity of the pigment suspension; and in most of such cases use of excess deflocculant apparently has little or no deleterious effect upon the desired reduction in adhesive requirement of the pigment resulting from practice of the invention. Nevertheless, large excesses of deflocculant, of the order of the entire adhesive requirement for example, may be attended by increased difficulties of manipulation. For instance, trouble from fouling of drier surfaces is likely to occur when drying a pigment containing large quantities of adhesive. Moreover, pigments dried with considerable quantities of adhesive invariably require prolonged ball-milling or equivalent grinding to make them re-disperse satisfactorily to an aqueous coating composition, thus making the preparation of coating compositions more difficult. Accordingly the preferred practice is to use for deflocculating as small a quantity of deflocculant as will give the desired results.

It is to be noted that the invention contemplates dewatering a deflocculated slurry of aqueous pigment suspension; identical results are not ordinarily obtained by dewatering first followed by addition of deflocculant. While the deflocculant is preferably added to the sludge during the process of manufacture of the pigment, fully dried pigment may if desired be made into a slurry with water and deflocculant and subsequently be dewatered. A reduction in adhesive requirement will be found following such treatment.

The following examples show the effect of the practice of the invention in various illustrative cases:

Example 1

A dry commercial grade of precipitated chalk was made into a paste of 44% solids with water; 1% of gum arabic (based on the dry weight of pigment) was added, and the mixture was then concentrated by filtration to a solids content of 54%. Before treatment the casein requirement of the pigment was 27; after treatment it was 20.

Example 2

A satin white paste of 20% solids was deflocculated by 2% of gum arabic. Part was kept as a blank and part was evaporated to a solids content of 50%. The casein requirement of the blank sample was 50; the casein requirement of the treated sample was 32.

Example 3

Dry commercial blanc fixe powder (barium sulfate) was made into a paste of about 55% solids with water and deflocculated by addition of 2% of casein dissolved in ammonia. The defloccuated slurry was substantially dried by evaporation to a solids content of 90%. The casein requirement of the original material was 6; the casein requirement of the treated sample, including the casein used for defloccuation, was 4.

Example 4

A freshly precipitated calcium carbonate sludge at 40% solids, made by reacting sodium carbonate with slaked lime, followed by washing to remove alkali, was deflocculated by addition of 2% of casein dissolved by alkali. The deflocculated slurry was substantially dried in contact with a steam heated surface to a solids content of 85%. The casein requirement of the untreated material was 20, of the treated pigment, including the casein used for defloccuation, 11.

The casein requirement stated in the preceding examples represent the pounds of casein necessary to bind exactly 100 pounds of the pigment in question against picking on a printing press using a standard printing ink, when the pigments and adhesives had been made into coating compositions, applied to one side of paper in the amount equal to 14 pounds per ream (25" x 38"—500 sheets), dried and supercalendered.

No wholly satisfactory explanation can at this time be advanced for the fact that an alkaline earth metal pigment, when deflocculated in an aqueous slurry by means of a suitable deflocculant, then dewatered as described, and thereafter made into a slurry with water and adhesive, requires materially less of the adhesive to yield an arbitrary standard of "tightness" of the pigment than it did prior to the treatment. Nevertheless, the phenomenon exists, and exists with respect to all pigments and pigment mixtures of the class described. Whether the relationship between the pigment and the deflocculant is one of simple absorption, or whether a more obscure physico-chemical relationship exists, is not known. It would appear from results obtained, however, that the pigment cannot be considered to be wholly inert toward the deflocculant under the conditions existing during the dewatering process described.

In making coating compositions with such treated pigments, the benefit of the resulting decrease in adhesive cost is obvious. Moreover, improvements in the quality of the pigment are reflected in improvement of surface characteristics of paper coated with such composition containing pigment of reduced adhesive requirement.

This application is a continuation-in-part of my copending application filed June 15, 1937, Serial No. 148,411.

I claim:

1. Process which comprises mixing an alkaline earth metal pigment in aqueous medium with a deflocculant in an amount, between 0.25% and 5.0% by weight based on the dry weight of the pigment, sufficient to deflocculate the pigment completely, dewatering the mixture in the presence of the deflocculant to a non-fluid condition and to such a degree that the adhesive requirement is substantially reduced, and subsequently mixing the non-fluid material with water and adhesive to form a coating composition.

2. Process as defined in claim 1 in which the pigment comprises an alkaline earth metal carbonate.

3. Process as defined in claim 1 in which the pigment comprises a calcium compound.

4. Method of reducing the adhesive requirement of satin white which comprises deflocculating the satin white in aqueous medium by addition of a deflocculant in amount less than 5% by weight of the dry weight of the satin white, and dewatering the deflocculated mixture to a non-fluid condition.

5. Method of reducing the adhesive requirement of satin white which comprises deflocculating the satin white in aqueous medium by addition of gum arabic in amount less than 5% by weight of the dry weight of the satin white, and dewatering the deflocculated mixture to a non-fluid condition.

6. Process which comprises mixing finely divided calcium carbonate in aqueous medium with a deflocculant in an amount less than 5% by weight of the dry weight of the calcium carbonate and less than half of the initial adhesive requirement of said calcium carbonate, dewatering the deflocculated slurry to substantial dryness, and making the so-treated calcium carbonate into a coating composition by mixing it with water and adhesive.

7. Process according to claim 6 in which both the deflocculant and the adhesive are casein.

8. A pigment base for a mineral paper coating composition, substantially consisting of satin white in the form of an aqueous non-fluid paste thereof containing dispersed therethrough a deflocculant in an amount between 0.25% and 5.0% by weight based on the dry weight of the satin white content, said pigment base being the substantially dewatered residue of a fluid aqueous sludge of satin white and deflocculant and having an adhesive requirement which is substantially less than the pigment base before substantial dewatering.

9. Process which comprises deflocculating an aqueous slurry of an alkaline earth metal pigment with from 0.25% to 5.0% of deflocculating agent, based on the dry weight of the pigment being treated, and dewatering the deflocculated slurry to a non-fluid condition to a point where the adhesive requirement of the pigment is appreciably reduced.

10. Process which comprises deflocculating an aqueous slurry of finely divided calcium carbonate by the addition thereto of an adhesive, having deflocculating properties, in an amount between 0.25% and 5.0% based on the dry weight of the calcium carbonate which amount of adhesive is less than half the initial adhesive requirement of said calcium carbonate, evaporating the resulting mixture to substantial dryness in contact with a heated surface, and mixing the substantially dry mixture with water and a further quantity of said adhesive having deflocculating properties to form a coating composition.

11. Process which comprises dewatering to substantial dryness an aqueous sludge of calcium carbonate pigment, produced by reacting a soluble carbonate with slaked lime, said pigment being substantially free from free alkali and containing an amount of a deflocculating agent corresponding to from 0.25% to 5.0% by weight of the calcium carbonate content of said sludge.

12. Process which comprises washing finely divided calcium carbonate pigment, produced by reacting a soluble carbonate with slaked lime until the same is substantially freed from soluble alkali, filtering the washed pigment, adding to the filter cake an amount of a deflocculating agent, corresponding to from 0.25% to 5.0% by weight of the calcium carbonate content, sufficient to render the filter cake fluid and drying the fluid mixture against a hot surface to a solids content of at least about 90%.

13. A pigment base for a mineral paper coating composition, substantially consisting of satin white in the form of an aqueous non-fluid paste containing dispersed therethrough gum arabic in an amount of the order of 2% based on the dry weight of the satin white content, said pigment base having a casein requirement of about 32, said pigment base being the substantially dewatered residue of a fluid aqueous sludge of satin white and gum arabic.

ALFRED D. WILSON.